(No Model.)
G. A. THOMPSON.
CAM FOR STAMP MILLS.
No. 493,129. Patented Mar. 7, 1893.
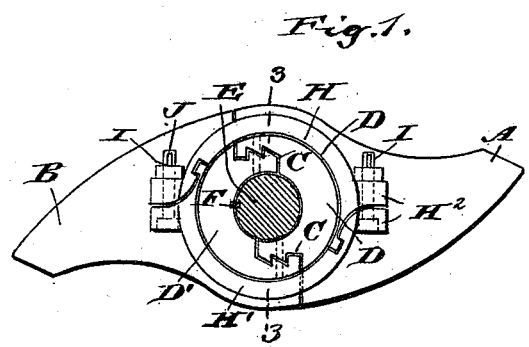
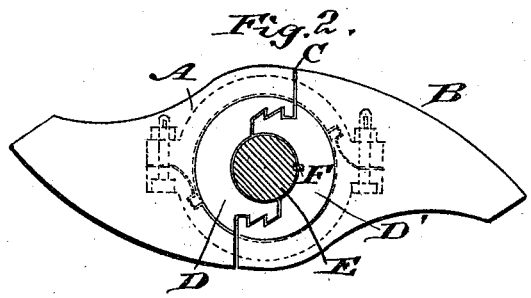
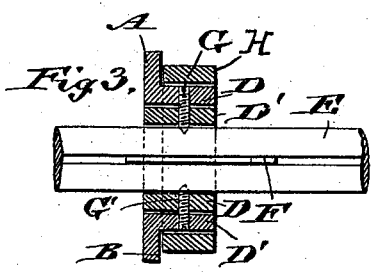
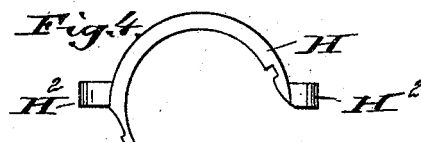
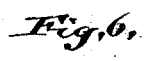
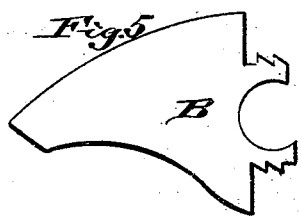
WITNESSES:
F. McArdle
C. Sedgwick
INVENTOR
G. A. Thompson
BY
ATTORNEYS.
THE NORRIS PETERS CO., PHOTO-LITHO., WASHINGTON, D. C.

UNITED STATES PATENT OFFICE.

GEORGE ALFRED THOMPSON, OF TOMBSTONE, ARIZONA TERRITORY.

CAM FOR STAMP-MILLS.

SPECIFICATION forming part of Letters Patent No. 493,129, dated March 7, 1893.

Application filed June 29, 1892. Serial No. 438,364. (No model.)

*To all whom it may concern:*

Be it known that I, GEORGE ALFRED THOMPSON, of Tombstone, in the county of Cochise and Territory of Arizona, have invented a new and Improved Cam for Stamp-Mills, of which the following is a full, clear, and exact description.

The object of the invention is to provide a new and improved cam for lifting the stamps of quartz or other stamp mills, and which is simple and durable in construction and made in sections for conveniently fastening the cam on the shaft or removing it therefrom without disturbing the other cams or parts on the same shaft.

The invention consists principally of the cam proper made in sections and forming a hub, and a band or ring engaging the said hub to lock the cam sections in place, the said band being made in sections adapted to be fastened together.

The invention also consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1 is a face view of the improvement with the shaft in section. Fig. 2 is a rear face view of the same. Fig. 3 is a cross section of the same on the line 3—3 in Fig. 1. Fig. 4 is a side elevation of one section of the band. Fig. 5 is a similar view of a cam section; and Fig. 6 is a side elevation of the bolt for fastening the band sections together.

The cam proper is made in two sections A and B, having the desired form for alternately lifting the stamps of the mill in the usual manner. The two sections A and B are fitted one on the other on an irregularly shaped joint C, passing through the central opening of the cam, each half of the joint being approximately of Z-shape with teeth in the middle part. On one side of the sections A, B, are formed the hub parts D, D', which when the cam sections are assembled, as shown in Figs. 1, 2 and 3, form a central opening for the shaft E, carrying the usual key F, and engaging the corresponding key seat in the hub section D'. It is understood that part of the joint C passes through the hub sections D and D' in the manner above described, relative to the cam sections A and B.

In order to hold the cam sections in position when jointed, two set screws G and G' are provided, of which the set screw G screws through the hub section D then through the hub section D', to finally engage with its inner pointed end an indentation formed in the shaft E. The other set screw G' is arranged diametrically opposite the set screw G and first passes through the hub section D' and then through D to finally engage with its inner pointed end another indentation in the shaft E. The set screws thus not only serve as an additional means for holding the cam sections in position, but also prevent the cam from revolving on the shaft E.

Around the hub sections D and D' passes a band made in two parts or sections H and H', jointed irregularly and provided with lugs H², engaged by bolts I, on which the nuts are locked in place by means of split keys J, as will be readily understood by reference to Figs. 1 and 6.

It will be seen that when the several parts are assembled and fastened to the shaft E by the key F and the set screws G and G', then the cam revolves with the shaft and the outer ends of the cam sections A and B actuate the stamp alternately in the usual manner.

When it is desired to remove the cam from the shaft without disturbing any of the other cams or parts on the said shaft, then the operator first removes the bolts I, then slides one band section longitudinally off the other until the two band sections are disengaged one from the other, to permit of removing both from the hub sections. The operator then unscrews the set screws G and G' so as to disconnect the hub sections D and D', after which the two cam sections A and B can be moved longitudinally in opposite directions to be disengaged from one another and to permit of finally removing the cam sections from the shaft. It will thus be seen that the several parts composing the cam can be disconnected without disturbing the position of the shaft or the other parts connected therewith.

In assembling the several parts a reverse order is followed; that is, the two cam sections are slid one over the other, then the set screws G and G' are screwed in the hub sections after which the band sections H and H' are placed over the hub sections, and the bolts I are then used to fasten the band sections together, as above described.

Having thus described my invention, I claim as new and desire to secure by Letters Patent—

1. A cam for stamp mills, comprising two interlocking toothed sections each provided with a hub portion, and a sectional band engaging the hub portions and provided with lugs for the reception of bolts, substantially as described.

2. A cam for stamp mills, comprising two interlocking sections each provided with a hub portion, screws passing through the hub portions of the sections, for engagement with the shafts and a sectional band surrounding the said hub portions, substantially as described.

3. A cam for stamp mills, comprising two sections provided with hub portions, the sections being fitted one onto the other by an irregularly shaped and toothed joint, screws passing through the hub portions and adapted to engage the shaft, and a sectional band surrounding the hub portions and provided with apertured lugs for the reception of bolts, substantially as described.

4. A device of the class described, comprising cam sections formed with hub sections and adapted to be united by an irregular joint, a band encircling the hub sections to lock the cam sections in place, the said band being made in sections, bolts engaging lugs on the said band sections to fasten the latter together, and split keys for locking the nuts of the said bolts in position, as set forth.

GEORGE ALFRED THOMPSON.

Witnesses:
WILLIAM A. KING,
DELMER E. DAVES.